(12) United States Patent
Tanaka

(10) Patent No.: US 10,952,383 B2
(45) Date of Patent: Mar. 23, 2021

(54) PLANT CULTIVATION SYSTEM

(71) Applicant: Suiko Tanaka, Miyagi (JP)

(72) Inventor: Suiko Tanaka, Miyagi (JP)

( * ) Notice: Subject to any disclaimer, the term of this patent is extended or adjusted under 35 U.S.C. 154(b) by 0 days.

(21) Appl. No.: 16/638,619

(22) PCT Filed: Jul. 27, 2018

(86) PCT No.: PCT/JP2018/028314
§ 371 (c)(1),
(2) Date: Feb. 12, 2020

(87) PCT Pub. No.: WO2019/035340
PCT Pub. Date: Feb. 21, 2019

(65) Prior Publication Data
US 2020/0245564 A1    Aug. 6, 2020

(30) Foreign Application Priority Data

Aug. 16, 2017 (JP) .............................. JP2017-157254

(51) Int. Cl.
*A01G 7/04* (2006.01)
*H05B 47/115* (2020.01)
*H05B 47/11* (2020.01)

(52) U.S. Cl.
CPC ............. *A01G 7/045* (2013.01); *H05B 47/11* (2020.01); *H05B 47/115* (2020.01)

(58) Field of Classification Search
None
See application file for complete search history.

(56) References Cited

U.S. PATENT DOCUMENTS

2010/0277078 A1    11/2010  Morton

FOREIGN PATENT DOCUMENTS

| JP | 5-328847 A | 12/1993 |
|----|------------|---------|
| JP | 6-67290 B2 | 8/1994 |
| JP | H0667290 B2 * | 8/1994 |

(Continued)

OTHER PUBLICATIONS

International Search Report issued in International Patent Application No. PCT/JP2018/028314, dated Oct. 30, 2018 and translation.

(Continued)

*Primary Examiner* — Dedei K Hammond
(74) *Attorney, Agent, or Firm* — Greenblum & Bernstein, P.L.C.

(57) ABSTRACT

The present invention provides a plant cultivation system that is possible to continue stable irradiation of an appropriate amount of light regardless of the weather condition and the like while utilizing the sunlight. Further, the present invention provides a plant cultivation system that is possible to prevent the humans from being exposed to a visual stress when the humans approach the place where the light suited for growing the plants is irradiated. The present invention relates to a plant cultivation system, comprising: a light measure that measures an amount of photons of sunlight; a light controller that controls an amount of photons to be irradiated to a plant according to the measured amount of photons; and a light irradiator that irradiates light to the plant in the controlled amount of photons.

4 Claims, 4 Drawing Sheets

(56) References Cited

FOREIGN PATENT DOCUMENTS

| | | | |
|---|---|---|---|
| JP | 2001-275488 A | | 10/2001 |
| JP | 20011275488 A | * | 10/2001 |
| JP | 5010864 B2 | | 8/2012 |
| JP | 2014-64479 A | | 4/2014 |

OTHER PUBLICATIONS

Written opinion of the International Searching Authority isseud in International Application No. PCT/JP2018/028314, dated Oct. 30, 2018.

* cited by examiner

PLANT CULTIVATION SYSTEM

BACKGROUND ART

Recently, an LED that emits light of a wavelength suited for growing plants is used for cultivating plants. However, the facility cost and the electricity cost are increased when light of the LED alone is used without using the sunlight at all. Therefore, there has been employed sunlight utilization-type plant cultivation that utilizes the sunlight while utilizing the light of the LED as well.

Further, as a method for irradiating the light suited for growing plants, for example, Patent Literature 1 proposes a method for cultivating plants by irradiating the sunlight and also continuously irradiating or pulse-irradiating light of a red LED and light of a blue LED.

CITATION LIST

Patent Literature

Patent Literature 1: JP 2014-064479 A

SUMMARY OF INVENTION

Technical Problem

With the sunlight utilization-type cultivation method, however, intensity of the sunlight irradiated to the plants varies depending on the weather condition and the like, so that it is difficult to continue stable irradiation of an appropriate amount of light.

Further, even though the environment where the light of the red LED and the light of the blue LED are continuously irradiated or pulse-irradiated is a desirable environment for the plants, it is an extremely stressful environment for humans who take care of the plants, shipment thereof, and the like.

The present invention is designed in view of the aforementioned problem. That is, a first object of the present invention is to provide a plant cultivation system capable of continuing stable irradiation of an appropriate amount of light regardless of the weather condition and the like while utilizing the sunlight.

Further, a second object of the present invention is to provide a plant cultivation system with which it is possible to prevent the humans from being exposed to a visual stress when the humans approach the place where the light suited for growing the plants is irradiated.

Solution to Problem

The above problems are solved with following ways.

[1] A plant cultivation system, including: a light measure that measures an amount of photons of sunlight; a light controller that controls an amount of photons to be irradiated to a plant according to the measured amount of photons; and a light irradiator that irradiates light to the plant in the controlled amount of photons.

[2] A plant cultivation system, including: a human perceptor that senses presence of a human; a growing light irradiator that irradiates growing light that is light for growing a plant, when presence of the human is not sensed; and a work light irradiator that irradiates work light that is light for securing visibility of the human, when presence of the human is sensed.

[3] The plant cultivation system according to [1], including a human perceptor that senses presence of a human, wherein the light irradiator irradiates growing light for growing the plant when presence of the human is not sensed, the system including: a stopper that stops measurement of the amount of photons of the sunlight and/or control of the amount of photons to be irradiated to the plant, when presence of the human is sensed; and a work light irradiator that irradiates work light that is light for securing visibility of the human, when presence of the human is sensed.

[4] The plant cultivation system according to [1] or [3], including: a light switch that switches irradiation of growing light and irradiation of work light; and a time detector that detects that presence of the human is not sensed for a prescribed time, wherein when the time detector detects that presence of the human is not sensed for a prescribed time, the light switch switches irradiation of the work light to the irradiation of the growing light.

[5] The plant cultivation system according to any one of [1], [3], and [4], wherein the light measure is provided in a mode with which the amount of photons of the light irradiated from the light irradiator is not measured.

Advantageous Effects of Invention

A first effect of the present invention is that it is possible to continue stable irradiation of an appropriate amount of light regardless of the weather condition and the like while utilizing the sunlight.

Further, a second effect of the present invention is that it is possible to prevent the humans from being exposed to a visual stress when the humans approach the place where the light suited for growing the plants is irradiated.

DESCRIPTION OF EMBODIMENTS

The embodiments of the present invention will be described with reference to the accompanying drawings hereinafter. In the following, the disclosure regarding effects are an aspect of the embodiments of the present invention, and are not limited to the following embodiments. Further, the sequential order of each processing constituting flowcharts described in the Description is a random order within a range where there is no confliction or inconsistency generated in the processing contents.

Configuration of Plant Cultivation System

Figure 1:
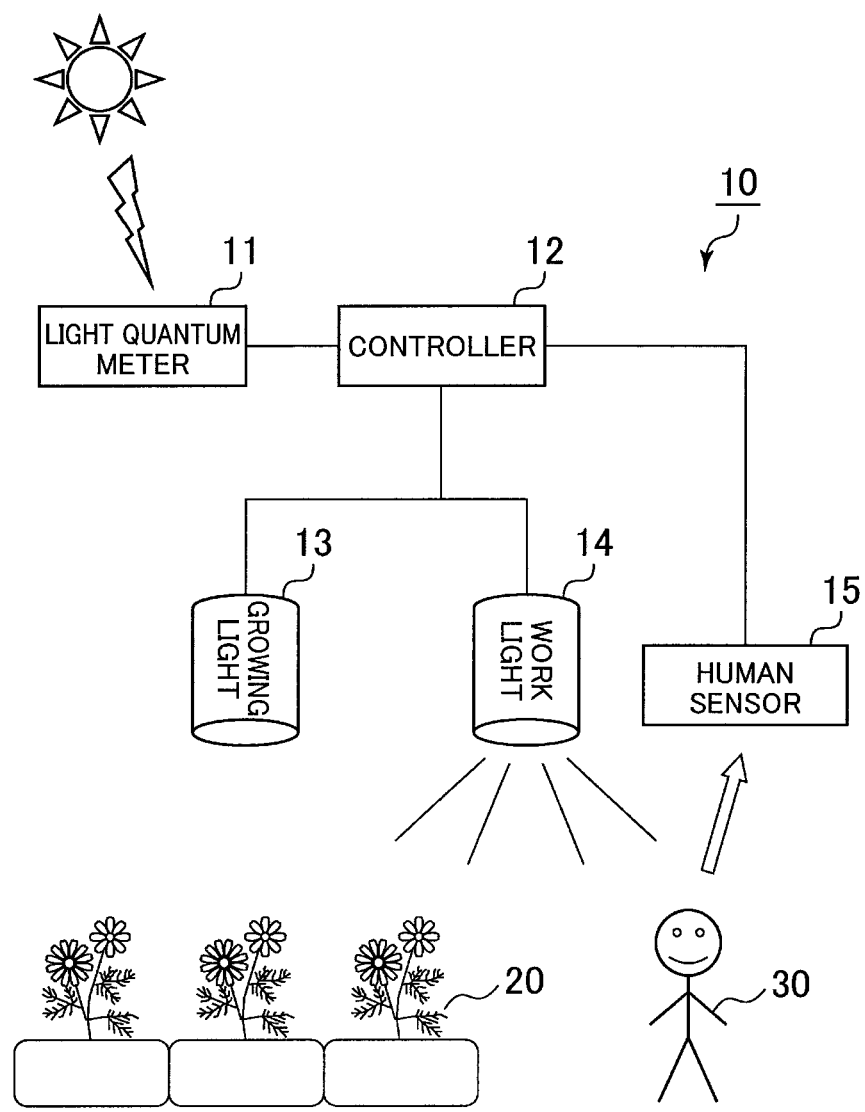
FIG. 1 is a diagram illustrating a configuration of a plant cultivation system according to an embodiment of the present invention.

FIG. 1 is a diagram illustrating a configuration of a plant cultivation system according to an embodiment of the present invention. As illustrated, a plant cultivation system 10 according to the embodiment includes a light quantum meter 11, a controller 12, a growing light source 13, a work light source 14, a human sensor 15, and the like.

The light quantum meter 11 is a light measure that measures the number of photons per second and per m² in a wavelength range of 400 to 700 nm that is a chlorophyll absorption wavelength range. The light quantum meter 11 displays the amount of photons in a unit of photosynthetic photon flux density ($\mu mol \cdot m^{-2} \cdot s^{-1}$).

The illuminance, luminous flux, or luminous intensity generally used as the unit of brightness is the value corrected to become closer to a sense of brightness felt by humans. For example, when light of a unicolor LED is measured by an illuminometer or the like, the illuminance of the LED emitting green light that exhibits high sensitivity for humans shows a higher numerical value compared to those of a red LED and a blue LED. In the meantime, plants especially absorb light of wavelengths of red and blue but do not absorb light of a wavelength of green so much. Thus, when the illuminance is used as the criteria when determining the amount of light for cultivating plants, it becomes difficult to calculate an appropriate amount of light for cultivating the plants. Therefore, it is preferable to measure the amount of photons by using a light quantum meter in order to calculate the amount of light suited for growing the plants.

The controller 12 is configured with a CPU (Central Processing Unit), a RAM (Random Access Memory), an HDD (Hard Disk Drive), a communication interface, and the like. The RAM is a work area of the CPU. The HDD is a memory area for saving programs and data.

The controller 12 is communicably connected with the light quantum meter 11, the growing light source 13, the work light source 14, and the human sensor 15 with wire or wirelessly via the communication interface. The controller 12 executes a prescribed stored program to perform calculation for controlling the amount of photons of the growing light source 13 according to input from the light quantum meter 11 and to perform control for switching the growing light source 13 and the work light source 14 according to input from the human sensor 15. Further, it is possible to employ a mode with which the controller 12 can be operated manually with a control panel.

The growing light source 13 is a light source that irradiates the light for cultivating plants 20. The light for cultivating the plants 20 has a wavelength suited for growing the plants 20. Further, the growing light source 13 is capable of controlling the amount of photons to be irradiated to the plants 20 according to the amount of photons of the sunlight. The amount of photons of the sunlight can be measured by the light quantum meter 11.

The total value of the amount of the photons of the growing light and the amount of the photons of the sunlight is set in advance in the controller 12, and the measured amount of photons of the sunlight is subtracted from the total value to control the amount of photons of the light irradiated from the growing light source 13. Further, it is preferable to determine the total value by comprehensively considering the kind of the plants 20, the wavelength of the light of the growing light source 13, and the irradiation time.

As the growing light source 13, it is possible to use an LED lightbulb. It is preferable to provide a plurality of growing light sources 13 according to the area where the plants 20 are to be cultivated. As a plurality of growing light sources 13 to be provided, it is possible to provide a single kind of light sources that irradiate light of a specific wavelength or to combine two or more kinds of light sources that irradiate light of different wavelengths. In a case of combining two or more kinds of light sources, it is possible to employ a mode with which light of different wavelengths is irradiated simultaneously or a mode with which such light is irradiated alternately. For example, it is possible to irradiate red light with a wavelength of 600 to 750 nm or to irradiate blue light with a wavelength of 430 to 480 nm simultaneously or alternately with the red light.

The sunlight utilization-type plant cultivation system utilizes the sunlight, so that it is necessary for the plant cultivation system or facilities where the plant cultivation system is placed to be configured in a mode capable of letting in the sunlight. Further, there may be a case where the sunlight is attenuated to some extent by a daylighting window, a plastic sheet, or the like. Therefore, it is preferable to configure the plant cultivation system 10 to be able to place the light quantum meter 11 in the vicinity of the plants 20 to be cultivated or to configure the plant cultivation system 10 to be able to place the light quantum meter 11 at a place where the extent of the attenuation of the sunlight is about the same as that of the plants 20.

Further, depending on a mode for placing the light quantum meter 11, the amount of photons of the growing light may be added to the amount of photons of the sunlight so that there is a possibility that the amount of photons of the sunlight seems to be estimated higher. Therefore, it is preferable to place the light quantum meter 11 in a mode with which the amount of photons of the growing light is not measured. For example, it is preferable to include means that shields the light quantum meter 11 from the growing light or to place the light quantum meter 11 on an upper side than the placed position of the growing light source 13.

As described above, by providing the light measure that measures the amount of photons of the sunlight, a light controller that controls the amount of photons to be irradiated to the plants in accordance with the measured amount of photons, and a light irradiator that irradiates the light to the plants in the controlled amount of photons, it is possible to continue stable irradiation of an appropriate amount of light regardless of the weather condition and the like while utilizing the sunlight.

While there is no specific limit set for the kinds of the plants 20 to be cultivated, it is preferable to appropriately set the wavelength of the light of the growing light source 13, the irradiation time, and the total value of the amount of photons of the growing light and the amount of photons of the sunlight according to the kinds of the plants 20.

Further, when a plurality of kinds of plants 20 are cultivated in a single facility, it is preferable to divide the lot for cultivating the plants 20 by partitions or the like for each kind of the plants 20 and irradiate the growing light for each kind of the plants 20 based on prescribed wavelengths, irradiation time, and amount of photons.

The work light source 14 is a light source for securing the visibility of humans. The colors of the light of the growing light source 13 such as red and blue are considered to be the colors that are not suited for humans to see. Therefore, it is preferable to employ a mode with which the light of the work light source 14 is irradiated while the light of the growing light source 13 is not irradiated when the humans who take care of the plants 20 and shipment thereof, for example, are in the vicinity of the plants 20.

As the work light source 14, it is possible to use a typical white light source such as an incandescent lightbulb, a fluorescent light, or a white LED light source. Further, it is preferable to place a plurality of work light sources 14 according to the size of the facility where the plants 20 are cultivated.

Further, it is also possible to employ a mode with which the growing light and the light of a prescribed wavelength are mixed to be used as the work light that secures the visibility of humans without turning off the growing light. In such case, it is preferable to employ a mode with which the amount of photons of the work light is also controlled according to the amount of photons of the sunlight as in the case of the amount of photons of the growing light.

The human sensor 15 is a human perceptor that senses presence of humans. The human sensor 15 is used to sense presence of humans and switch the growing light to the work light. While there is no specific limit set for the kind of the human sensor 15, it is possible to use an infrared sensor, an optical sensor, a sonic sensor, or a weight sensor, for example.

While there is no specific limit set for a mode for placing the human sensor 15, the human sensor 15 may be placed at a single point or at a plurality of points. Further, it is not necessary for the human sensor 15 to sense presence of humans in the whole regions within the facility where the plants 20 are cultivated, so that the human sensor 15 may be placed to be able to sense presence of humans in the vicinity of the entrance, passages, and the like where the humans go through.

As described above, by providing the human perceptor that senses presence of humans, a growing light irradiator that irradiates the growing light that is the light for growing the plants when presence of humans is not sensed, and a work light irradiator that irradiates the work light that is the light for securing the visibility of humans when presence of humans are sensed, it is possible to prevent the humans from being exposed to a visual stress when the humans approach the place where the light suited for growing the plants is irradiated.

Further, it is preferable to employ a mode with which the amount of photons of the sunlight is not measured by the light quantum meter 11, a mode with which the appropriate amount of photons of the growing light is not calculated by the controller 12 or a mode where the amount of photons of the growing light source 13 is not controlled while the work light for securing the visibility of humans is being irradiated, that is, while the human sensor 15 is sensing presence of humans. With such configuration, it is possible to prevent the load from being imposed on the plant cultivation system 10 and the power from being consumed because of unnecessary processing.

Further, as described above, under the mode where the amount of photons of the sunlight is not measured by the light quantum meter 11, the mode with which the appropriate amount of photons of the growing light is not calculated by the controller 12, or the mode where the amount of photons of the growing light source 13 is not controlled, it is preferable to perform switching processing to again measure the amount of photons of the sunlight by the light quantum meter 11, to calculate the appropriate amount of photons of the growing light by the controller 12, or to control the amount of photons of the growing light source 13 when presence of humans is no longer sensed by the human sensor 15.

Processing for Controlling Growing Light

Figure 2:
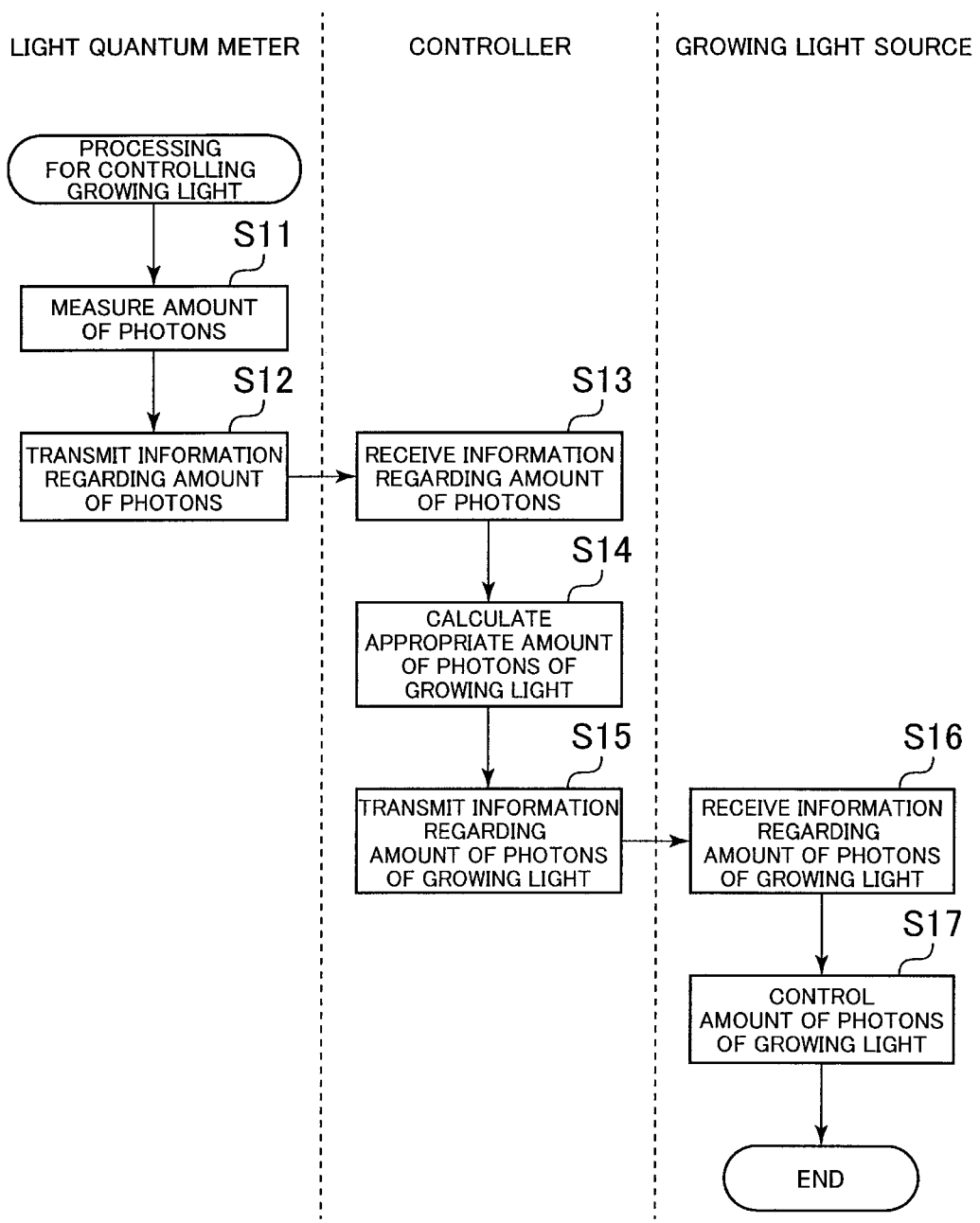
FIG. 2 is a flowchart showing an example of a flowchart regarding processing for controlling the growing light according to the embodiment of the present invention.

FIG. 2 is a flowchart showing an example of a flowchart regarding processing for controlling the growing light according to the embodiment of the present invention. First, the amount of photons of the sunlight is measured by the light quantum meter 11 (step S11). Then, information regarding the measured amount of photons is transmitted from the light quantum meter 11 to the controller 12 (step S12).

While there is no specific limit set for transmission intervals of the information regarding the amount of photons, it is possible to employ a mode with which the information is transmitted by every prescribed time interval such as every second, every minute, or every hour. By setting the shorter time interval, the plants 20 can be cultivated with an optimum amount of photons at all times. By setting the longer time interval, the load for controlling the amount of photons can be lightened.

A mode for transmitting the information regarding the amount of photons may be executed with wire or wirelessly. Further, it is also possible to employ a mode with which measurement of the amount of photons and transmission of the information regarding the amount of photons are not performed in a case such as at night where almost no amount of photons can be measured or in a case where the work light is irradiated so that irradiation of the growing light is unnecessary, for example.

After receiving the information regarding the amount of photons transmitted from the light quantum meter 11 (step S13), the controller 12 calculates the appropriate amount of photons for the growing light (step S14). The appropriate amount of photons for the growing light can be calculated by setting in advance the total value of the amount of photons of the sunlight and the amount of photons of the growing light and by subtracting the amount of photons of the sunlight from the total value. It is preferable to set the total value by comprehensively considering the kinds of the plants 20, the wavelength of the light of the growing light source 13, and the irradiation time thereof.

After calculating the appropriate amount of photons of the growing light (step S14), the controller 12 transmits the information regarding the amount of photons of the growing light to the growing light source 13 (step S15). It is possible to employ a mode with which calculation of the amount of photons of the growing light and transmission of the information regarding the amount of photons of the growing light are not performed in a case where the work light is irradiated so that irradiation of the growing light is unnecessary, for example.

After receiving the information regarding the amount of photons of the growing light transmitted from the controller 12, the growing light source 13 controls the growing light such that the amount of photons can be irradiated (step S17). It is possible to employ a mode with which the amount of photons can be controlled without steps or with multi-steps. With the processing described above, it becomes possible to continue stable irradiation of an appropriate amount of light regardless of the weather condition and the like while utilizing the sunlight.

Processing for Switching to Work Light

Figure 3:
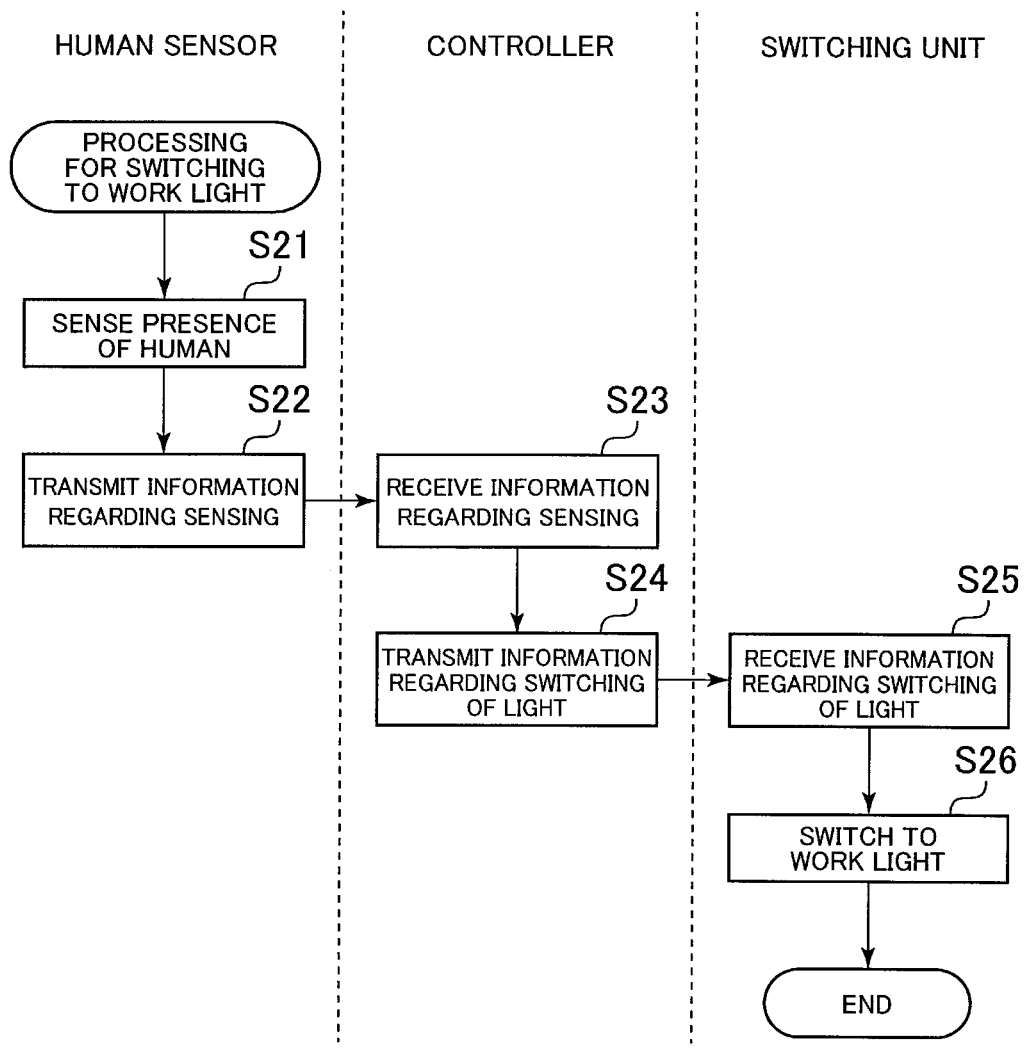
FIG. 3 is a flowchart showing an example of a flowchart regarding processing for switching to the work light according to the embodiment of the present invention.

FIG. 3 is a flowchart showing an example of a flowchart regarding processing for switching to the work light according to the embodiment of the present invention. First, the human sensor 15 senses presence of a human 30 (step S21). As the human sensor 15, it is possible to use a known sensor such as an infrared sensor, an optical sensor, a sonic sensor, or a weight sensor.

When the human sensor 15 senses the presence of the human 30, the human sensor 15 transmits the information regarding the sensing to the controller 12 (step S22). A mode for transmitting the information regarding the sensing may be executed with wire or wirelessly.

Upon receiving the information regarding the sensing transmitted from the human sensor 15 (step S23), the controller 12 transmits information regarding switching of the light to a switching unit (step S24).

The switching unit is a part that enables switching of the growing light and the work light. As the switching unit, it is possible to use a known switching circuit or the like. With a function of the switching circuit or the like, it is possible to switch whether to operate the growing light source 13 or to operate the work light source 14.

When the switching unit receives the information regarding switching of the light (step S25), the growing light is switched to the work light (step S26). With the processing described above, it is possible to prevent the human 30 from being exposed to a visual stress when the human 30 approaches the place where the light suited for growing the plants 20 is irradiated.

Processing for Switching to Growing Light

Figure 4:
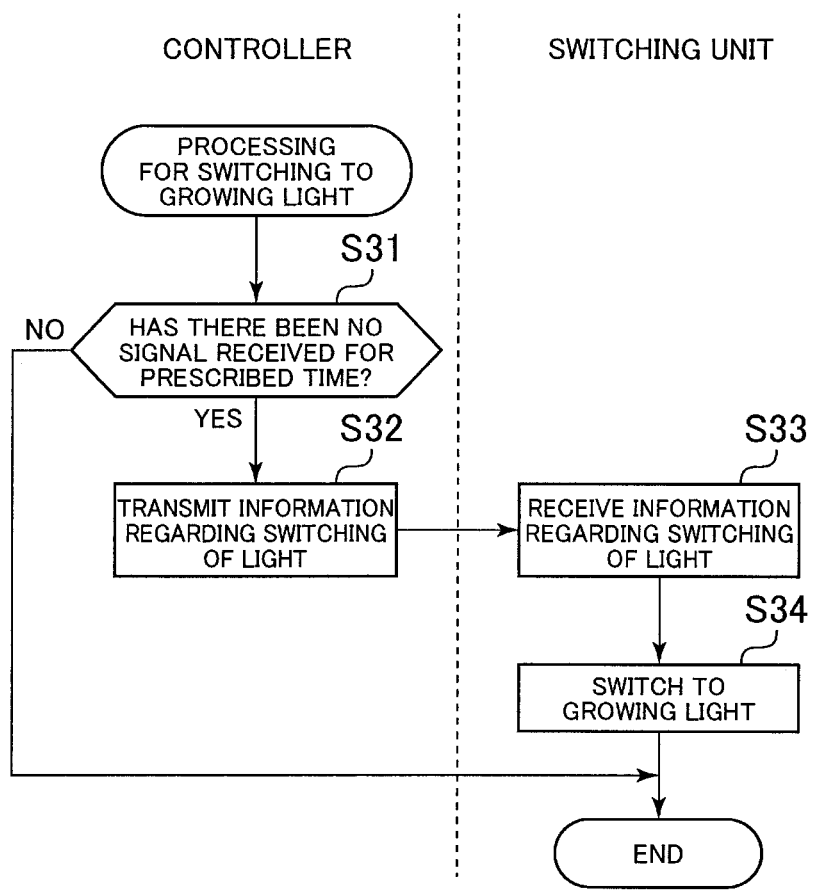
FIG. 4 is a flowchart showing an example of a flowchart regarding processing for switching to the growing light according to the embodiment of the present invention.

FIG. 4 is a flowchart showing an example of a flowchart regarding processing for switching to the growing light according to the embodiment of the present invention. First, the controller 12 determines whether or not a signal that is transmitted when presence of the human 30 is sensed is received in the controller 12 for a prescribed time (step S31).

When the signal is received within a prescribed time (NO in step S31), irradiation of the work light that secures the visibility of humans is continued. When the signal is not received for a prescribed time (YES in step S31), the controller 12 transmits the information regarding switching of the light (step S32).

There is no specific limit set for the time intervals for determining whether or not the signal transmitted when the presence of the human 30 is sensed is received. When the time interval is too short, the work light may be switched to the growing light even though the human 30 is present in a case where it is difficult to sense the presence of the human 30, for example. In the meantime, when the time interval is too long, the time without switching the work light to the growing light becomes longer so that the time for irradiating the light suited for growing the plants 20 tends to become shorter. Therefore, it is preferable to set the time intervals for determining whether or not the signal transmitted when the presence of the human 30 is sensed is received to be about 0.5 to 1.5 minutes.

Upon receiving the information regarding switching of the light (step S33), the switching unit stops irradiation of the work light that secures the visibility of the human and restarts irradiation of the growing light for cultivating the plants 20. The processing described above makes it possible to prevent the human 30 from being exposed to a visual stress when the human 30 is present and to irradiate the light suited for growing the plants 20 when the human 30 is no longer present.

REFERENCE SIGNS LIST

10 PLANT CULTIVATION SYSTEM
11 LIGHT QUANTUM METER
12 CONTROLLER
13 GROWING LIGHT SOURCE
14 WORK LIGHT SOURCE
15 HUMAN SENSOR
20 PLANTS
30 HUMAN

The invention claimed is:

1. A plant cultivation system, comprising:
    a light measure that measures an amount of photons of sunlight;
    a light controller that controls an amount of photons to irradiate a plant according to the measured amount of photons measured by the light measure;
    a light irradiator that irradiates the plant with light with the controlled amount of photons;
    a human perceptor that senses the presence of a human, wherein the light irradiator irradiates the plant with growing light for growing the plant when the human perceptor fails to sense the presence of the human;
    a stopper that stops measurement of the amount of photons of the sunlight by the light measure and/or control of the amount of photons to irradiate the plant by the light controller, when the human perceptor senses the presence of the human; and
    a work light irradiator that emits a work light that is light for securing visibility of the human, when the human perceptor senses the presence of the human.

2. The plant cultivation system according to claim 1, wherein the light measure measures the amount of photons of sunlight in a mode in which the amount of photons of the light irradiating the plant by the light irradiator is not measured.

3. A plant cultivation system, comprising:
    a human perceptor that senses the presence of a human;
    a growing light irradiator that irradiates a plant with a growing light that is light for growing the plant, when the human perceptor fails to sense the presence of the human;
    a work light irradiator that emits a work light that is light for securing visibility of the human, when the human perceptor senses the presence of the human;
    a light switch that switches on and off the growing light irradiator and the work light irradiator; and
    a time detector that detects that the human perceptor fails to sense the presence of the human for a prescribed time, wherein when the time detector detects that the human perceptor fails to sense the presence of the human for the prescribed time, the light switch switches off the work light irradiator and switches on the growing light irradiator.

4. A plant cultivation system, comprising:
    a light measure that measures an amount of photons of sunlight;
    a light controller that controls an amount of photons to irradiate a plant according to the measured amount of photons measured by the light measure;
    a light irradiator that irradiates the plant with light with the controlled amount of photons;
    a light switch that switches on and off a growing light and a work light; and
    a time detector that detects that the presence of a human is not sensed for a prescribed time, wherein
    when the time detector detects that the presence of the human is not sensed for the prescribed time, the light switch switches off the work light and switches on the growing light.

* * * * *